US008727779B2

(12) United States Patent
Eversole et al.

(10) Patent No.: US 8,727,779 B2
(45) Date of Patent: May 20, 2014

(54) AUTHORING OF DEMONSTRATION ENVIRONMENTS

(75) Inventors: John Eversole, Seattle, WA (US); David Gunasegaram, Redmond, WA (US); Robert M. Kowal, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 713 days.

(21) Appl. No.: 12/463,172

(22) Filed: May 8, 2009

(65) Prior Publication Data

US 2010/0287472 A1    Nov. 11, 2010

(51) Int. Cl.
 *G09B 19/00* (2006.01)
(52) U.S. Cl.
 USPC .......................... 434/118; 717/120; 715/714
(58) Field of Classification Search
 USPC ................... 715/731, 714; 717/120; 434/118
 See application file for complete search history.

(56) References Cited

U.S. PATENT DOCUMENTS

| | | | |
|---|---|---|---|
| 5,557,732 A | 9/1996 | Thompson | |
| 5,870,683 A | 2/1999 | Wells et al. | |
| 2006/0041632 A1 | 2/2006 | Shah et al. | |
| 2007/0118801 A1 | 5/2007 | Harshbarger et al. | |
| 2007/0271234 A1 | 11/2007 | Ravikiran | |
| 2007/0282710 A1* | 12/2007 | Lim et al. | 705/27 |
| 2008/0225124 A1* | 9/2008 | Schinner et al. | 348/207.99 |
| 2008/0270978 A1 | 10/2008 | Leung | |
| 2009/0037522 A1* | 2/2009 | Ozawa et al. | 709/203 |
| 2009/0083710 A1* | 3/2009 | Best et al. | 717/120 |

OTHER PUBLICATIONS

"Demo Builder 7", Retrieved at <<http://www.demo-builder.com/>>, p. 1-1.
"Softpedia", "Flash Demo Builder 1.2 Build 1474", Retrieved at <<http://www.softpedia.com/get/Authoring-tools/Help-e-book-creators/Flash-Demo-Builder.shtml>>, Nov. 7, 2008, pp. 1-5.
"WareSeeker.com!", "Instant Demo 7.00", Retrieved at <<http://wareseeker.com/Business-Finance/instant-demo-7.00.zip/5000356>>, Oct. 13, 2008, pp. 1-4.

\* cited by examiner

*Primary Examiner* — Amy Ng
*Assistant Examiner* — Di Xiao
(74) *Attorney, Agent, or Firm* — John Jardine; Andrew Sanders; Micky Minhas (57) ABSTRACT

An authoring system is provided for generating a demonstration payload, which is installable on a target electronic device to create a demonstration environment on the target electronic device. The authoring system includes a build interface operative to receive authoring inputs which specify characteristics of the demonstration environment. The authoring inputs include specification of promotional media to be played during a promotional mode of the demonstration environment, and specification of mock user data to be accessible during a tryout mode of the demonstration environment. The system further includes an assembler module operative to generate the demonstration payload based upon the authoring inputs.

20 Claims, 6 Drawing Sheets

AUTHORING OF DEMONSTRATION ENVIRONMENTS

BACKGROUND

Electronic devices are often loaded with video content that serves a promotional purpose. For example, stores that sell mobile phones often will place floor model phones on a display rack to allow customers to observe and interact with the phones. The video content can serve to attract the initial interest of a customer, tout benefits of the product, demonstrate features, etc. The video content employed in this type of setting typically is customized and created by a third party vendor using sophisticated development tools.

In addition to providing video content or other promotional media, it is often desirable to allow customers to try out the various features of the electronic device being promoted. The customer's experience with the device can be limited, however, by the sample data on the device. In some cases, little or no sample data may be provided. The sample data may be unrealistic. Other customers may have changed settings on the device or modified data to include inappropriate or otherwise undesirable material.

SUMMARY

The present discussion provides an authoring system for creating a demonstration environment that can be deployed to one or more target electronic devices. The demonstration environment includes promotional media (e.g., promotional video content) and may include other software and settings to enhance demonstration and testing of the target electronic device, for example by a customer in a retail store.

The authoring system includes a build interface which receives authoring inputs that specify characteristics of the demonstration environment. The authoring inputs include specification of promotional media to be played during a promotional mode of the demonstration environment, and specification of mock user data to be accessible during a tryout mode of the demonstration environment. The authoring system further includes an assembler module which generates an installable demonstration payload based on the authoring inputs. The payload is installable on a target electronic device to create the demonstration environment.

The above Summary is provided to introduce a selection of concepts in a simplified form that are further described below in the Detailed Description. This Summary is not intended to identify key features or essential features of the claimed subject matter, nor is it intended to limit the scope of the claimed subject matter. Furthermore, the claimed subject matter is not limited to implementations that solve any or all disadvantages noted in any part of this disclosure.

DETAILED DESCRIPTION

Figure 1:
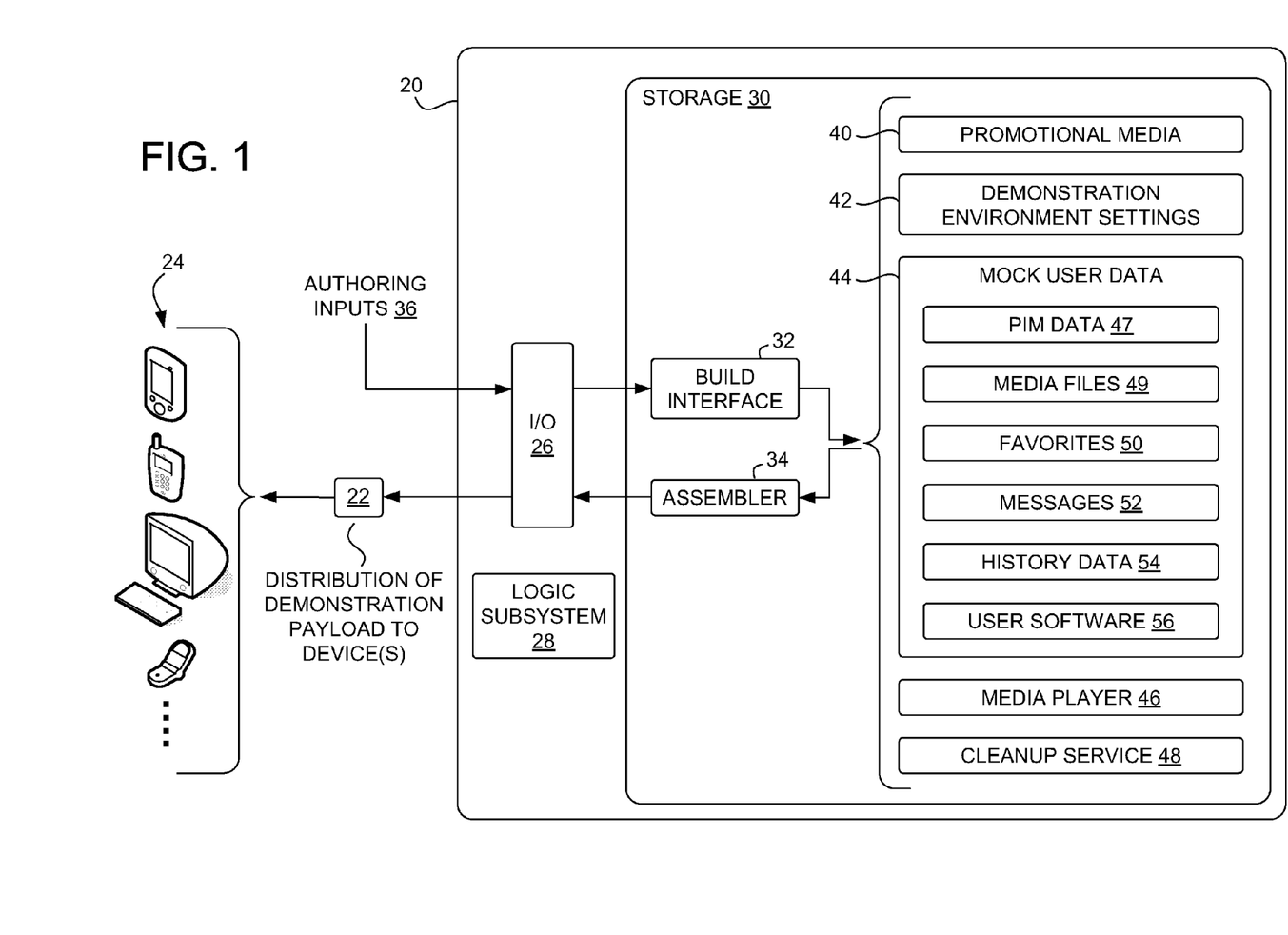
FIG. 1 is a schematic depiction of an exemplary authoring system for generating a demonstration environment and deploying the demonstration environment to one or more electronic devices.

Referring first to FIG. 1, the figure schematically depicts an authoring system 20 for generating an installable demonstration payload 22. Demonstration payload 22 is designed to facilitate deployment of a demonstration environment to one or more electronic devices 24. In particular, demonstration payload 22 enables the installation of applications and data on a target electronic device, and controls configuration at the target electronic device to ensure the target electronic device provides a demonstration environment having desired characteristics. The present discussion will at times focus on mobile phones and other portable electronic devices, though it will be appreciated that a virtually limitless variety of other electronic devices may be used.

As used herein, "demonstration environment" refers to the configuration employed for an electronic device in a promotional type setting, for example in a retail environment where potential purchasers can physically handle and try out a device, or in a tour/exhibition where electronic devices are provided to participants to present audio, video or other content. The demonstration environment of such a device may be defined by applications and data loaded onto the device, and/or by settings which control how the device operates in the setting.

For example, the present discussion will at times focus on retail settings featuring portable electronic devices (e.g., floor-model mobile phones), in which the demonstration environment includes video content or other promotional media played by a special-purpose media player. Typically, the goal of the promotional media is to generate consumer interest and/or advertise features and benefits of the device. The demonstration environments discussed herein also include mock user data, for example, photos, music files, calendar appointments, etc., to allow a user to try out the device and better understand its features.

In addition to or instead of retail implementations, the described systems and methods may be employed in other promotional settings that involve demonstration or exhibiting of information with an electronic device. For example, in the context of a tour or exhibition (e.g., a museum or walking tour), authoring system 20 may be used to deploy a demonstration environment to portable electronic devices that present content to participants of the tour/exhibition.

Continuing with FIG. 1, authoring system 20 may include various hardware and/or software components to generate the demonstration payload 22 used to deploy the demonstration environment to devices 24. In the depicted example, the authoring system is implemented in connection with a computing system having various interconnected subsystems, including I/O subsystem 26, logic subsystem 28 (e.g., one or more processors) and storage subsystem 30. In particular, logic subsystem 28 typically is configured to perform processing operations and execute instructions contained on storage subsystem 30, which may include various memory and/or mass storage components.

More particularly, executable components on storage subsystem 30 may include a build interface 32 and an assembler module 34. Build interface 32 is operable to receive authoring inputs 36 via I/O subsystem 26 which specify characteristics of the demonstration environment that is to be created at one or more target electronic devices 24. As will be described in more detail below with reference to FIGS. 2-7, build interface 32 may include a plurality of wizard screens to enable an author of the demonstration environment to specify its characteristics. Based on authoring inputs 36, assembler module 34 generates the demonstration payload 22.

Demonstration payload 22 may be provided to the target electronic devices 24 in a variety of ways. In one example, demonstration payload 22 is distributed over the Internet or another communications network. In another example, demonstration payload 22 is loaded onto a memory card or other storage mechanism readable by a target device. More particularly, a demonstration payload may be loaded on a secure digital memory card which is then used to install and create the demonstration environment on a target electronic device.

Build interface 32 and assembler module 34 may interact with various other items in storage subsystem 30, as indicated on the right side of FIG. 1. These items may include promotional media 40, demonstration environment settings 42, mock user data 44, kiosk-mode media player 46 and cleanup service 48. Mock user data may include, by way of example, personal information management (PIM) data 47, media files 49, favorites 50, messages 52, history data 54, and user software 56. In some cases, these items are applications/services that are bundled into demonstration payload 22 and installed on the target electronic device as part of the demonstration environment (e.g, kiosk-mode media player 46). In some cases, the items are data that is readable/usable by applications running on the target electronic device (e.g., promotional media 40 is content that can be played by kiosk-mode media player 46). In some cases, the items may include settings which specify operation of applications or other aspects of the demonstration environment. For example, an operator of the system can specify volume settings and other playback parameters for the promotional media 40. These settings can be stored in the demonstration environment settings 42 and incorporated into the installable demonstration payload 22.

Referring now to FIGS. 2-7, the figures show exemplary wizard screens of build interface 32 (FIG. 1) that may be used to receive various authoring inputs 36 (FIG. 1). As used herein, the terms "wizard" or "wizard screen" refer to interface screens that typically include dialogue-box and/or assistant-type input mechanisms, and that provide a step-by-step mechanism for receiving inputs.

Figure 2:
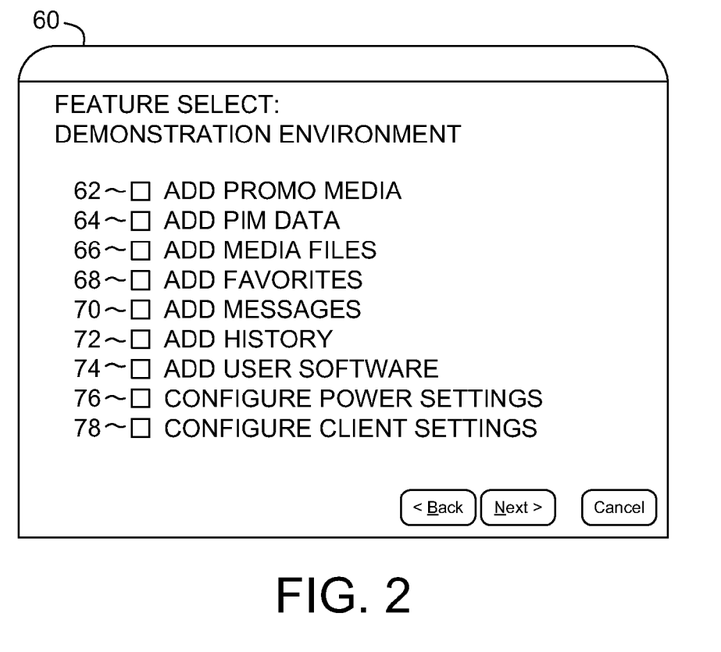
FIGS. 2-7 depict exemplary interface screens for receiving authoring inputs to construct a demonstration environment.

Referring first to FIG. 2, wizard screen 60 may be used to enable and disable various options for the demonstration environment. For example, checkbox 62 allows the author to elect to have promotional media be part of the demonstration environment being authored. Various additional checkbox options may be employed, including checkbox 64 for adding PIM data; checkbox 66 for adding media files; checkbox 68 for adding favorites; checkbox 70 for adding messages; checkbox 72 for adding history data; and checkbox 74 for adding user software.

Wizard screen 60 may also include a checkbox 72 to allow an author an option to configure power settings. For example, an author using authoring system 20 (FIG. 1) could know in advance that the demonstration environment is intended for a particular mobile phone. In such a case, the author could specify settings related to power consumption on the device, for example, that the backlight control operate in a particular way. Finally, checkbox 78 may be included to allow specification of additional settings of the demonstration environment, such as how cleanup service 48 (FIG. 1) operates to periodically maintain the demonstration environment at a target device.

Figure 3:
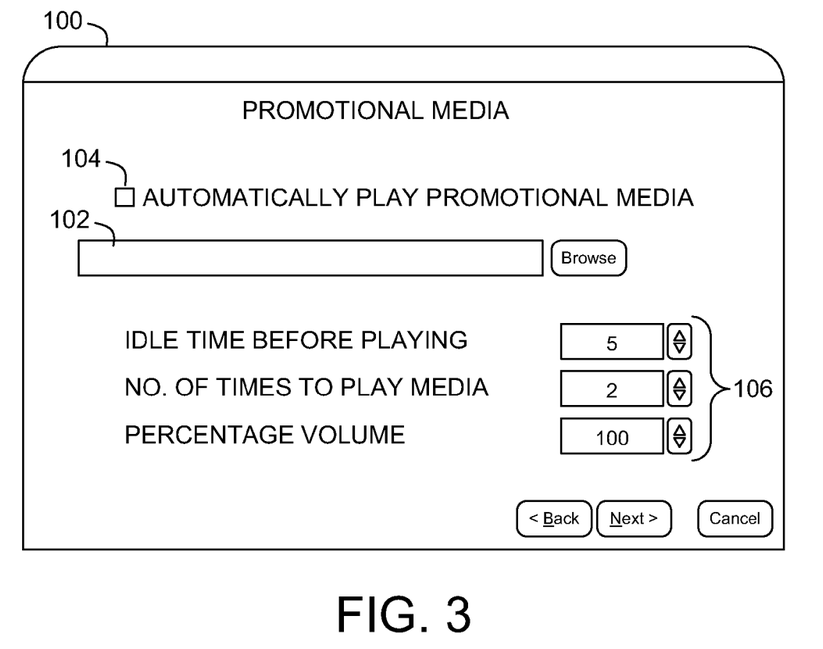

Selection of the various options on wizard screen 60 typically results in activation of a subsequent wizard screen for receiving further authoring inputs that are relevant to the selected option(s). FIG. 3, for example, shows a wizard screen 100 which enables an author to select the specific promotional media to be employed in the demonstration environment. In particular, the author can specify a particular file (or multiple files) for the promotional media 40 (FIG. 1), via browsing or direct entry into input box 102. In many cases, it will be desirable that the promotional media be in video form, although photographs, audio and other media may be employed. Wizard screen 100 may also include a checkbox 104 to receive an authoring input to enable or disable automatic playback of promotional media, such as the promotional media 40 of FIG. 1.

In the case of audio and video files, additional authoring inputs may be received via wizard screen 100 to specify particular playback settings. Wizard screen may also include additional input boxes 106 to receive input of playback settings.

A demonstration environment deployed on a mobile phone provides a useful context for understanding the playback settings which may be specified via input boxes 106. The demonstration environments described herein may include a promotional mode and a tryout mode. On a mobile phone, the promotional mode would occur when the promotional media is being played—for example, a video clip being played by kiosk-mode media player 46 (FIG. 1) in order to attract customers browsing in a physical retail setting. At other times (i.e., when the video is not playing), the phone would be in the tryout mode, in which the kiosk-mode media player is inactive and the other applications and data on the phone are accessible to a potential customer. As discussed in the various examples herein, the authoring system enables generation of a demonstration environment that is pre-populated with mock data (PIM data, mock media files, etc.), to enhance the tryout mode and enrich the customer's experimental interaction with the device.

Continuing with this example context, the input boxes 106 allow the author of the demonstration environment to specify an amount of idle time before playing the promotional media on the mobile phone. For example, the idle time can refer to how long the phone is to remain in tryout mode without receiving any user inputs before the kiosk-mode media player 46 (FIG. 1) initiates or resumes playback of the promotional video (promotional mode).

The inputs receivable at input boxes 106 can also allow the author to specify how long the kiosk-mode media player plays the promotional video. This may be expressed in terms of a number of times to play the media (as shown in the figure), and/or a specified time interval. The device could then go into the tryout mode or a powersave mode, for example.

The example playback settings can also allow the author to specify a volume level for the promotional media. In the present example, this is expressed in terms of a percentage of a reference volume level. In particular, the hardware and/or software on the phone may result in a maximum potential volume, and a percentage input received via input boxes 106 can cause the promotional media to be played at the designated percentage of the maximum volume.

In many cases, the author will want to construct a demonstration environment for devices that run personal information management (PIM) software. As discussed above, the provision of mock user data 44 (FIG. 1) can enhance the tryout mode of the demonstration environment. Accordingly, the author may want the mock user data to include PIM items (emails, contacts, appointments and other calendar items, tasks, etc.) that are readable and usable by a PIM application on the target electronic device.

Figure 4:
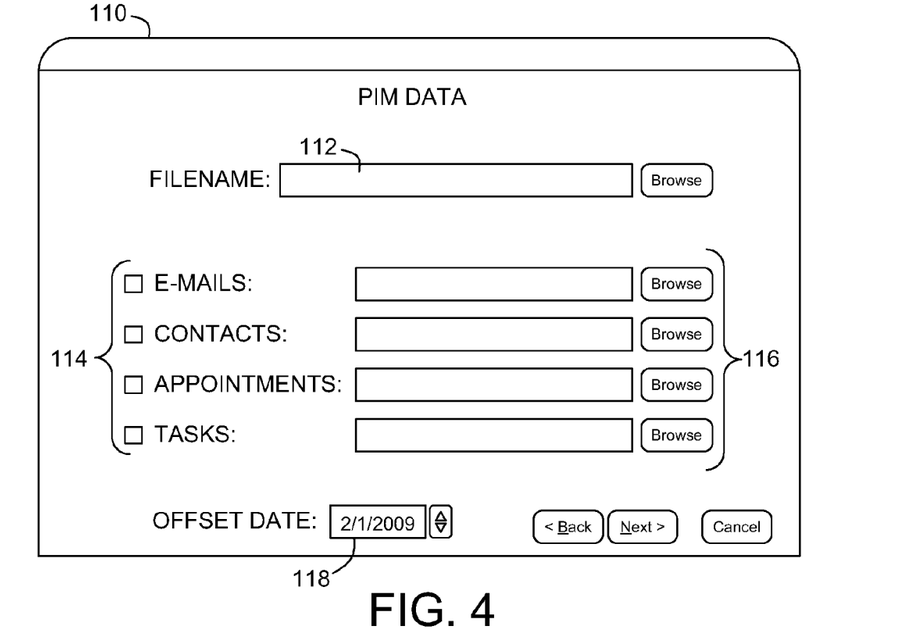

FIG. 4 depicts an example of a wizard screen 110 which may be used to designate specific PIM data 47 (FIG. 1) that the assembler module 34 (FIG. 1) incorporates into the demonstration environment. Wizard screen 110 may include an input box 112 to designate a file or files containing the mock PIM items. For example, the author could specify a .pst file (Personal Storage Table) containing messages, calendar events, etc. that are readable by various PIM-aware Microsoft applications (Microsoft Outlook, Microsoft Exchange, etc.), or by any other PIM software. Alternatively, particular categories of PIM items may be selected via checkboxes 114, along with corresponding inputs receivable via input boxes 116 to specify the locations of items in the selected categories. For example, the demonstration environment author could set up a sample data folder system within a PIM application on storage subsystem 30 (FIG. 1). The inputs received via input boxes 116 would then point to particular locations within the sample data folder subsystem (e.g., a subfolder with sample task items), so as to allow the assembler module 34 (FIG. 1) to pull in the sample PIM data 47 (FIG. 1).

In connection with the PIM data, build interface 32 (FIG. 1) may also be configured to receive specification of an offset date, as shown at input box 118 in FIG. 4. When employed, the offset date resets the oldest PIM item so that, when presented in the demonstration environment, the oldest item appears as if it were created on the offset date. The creation dates on the other PIM items are then adjusted relative to the offset date. The use of an offset in some cases can enhance the tryout mode of the demonstration environment, for example by ensuring that a sample calendar includes at least some events occurring in the near future.

Referring again to FIG. 1, the mock user data specified by authoring inputs 36 may also include user media files 49 readable by a media-presenting application of the target electronic device. For example, the user media files might include digital photographs that can be viewed on a photo gallery application of a mobile phone. Other examples are music track files (e.g., .mp3 files) and videos that can be played by media player applications on a smartphone or personal digital assistant.

Figure 5:
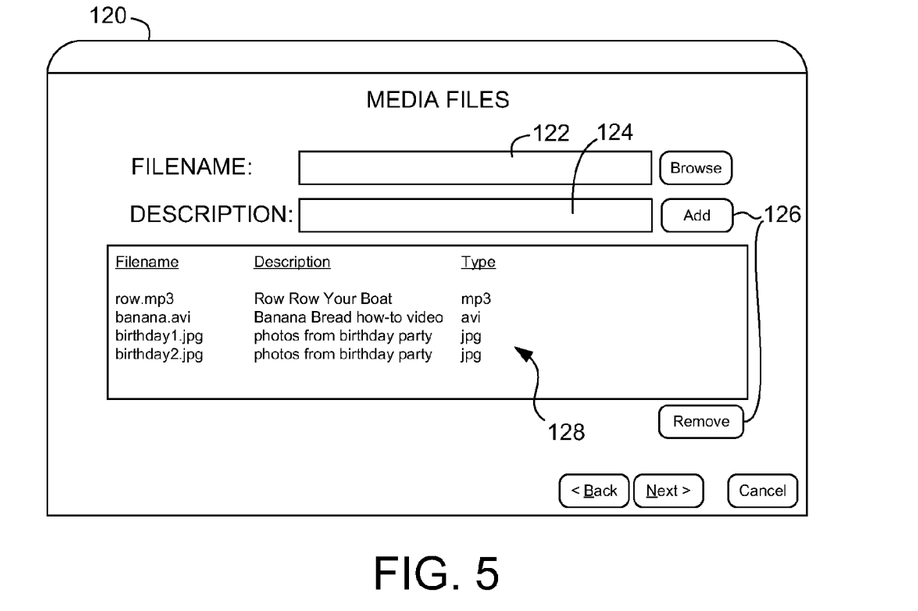

Accordingly, FIG. 5 depicts an example of a wizard screen 120 configured to accept author specification of media files for the mock user data. In particular, the depicted example includes mechanisms for designating filenames and corresponding descriptions, as shown respectively at input box 122 and input box 124. Actuators 126 may be provided to enable specific files to be added to and/or removed from a displayed list 128 of media files to be incorporated into the demonstration environment.

Figure 6:
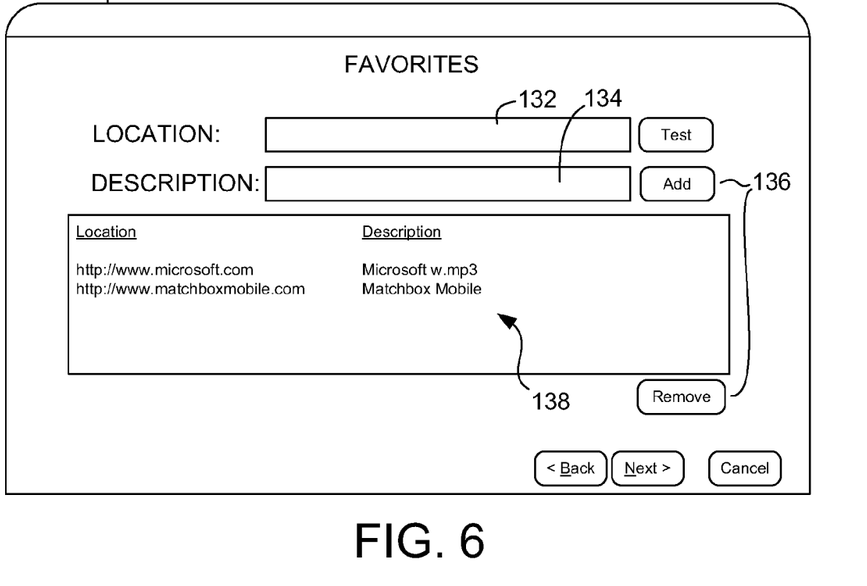

The mock user data specified by authoring inputs 36 (FIG. 1) may also include browser favorites readable by a browsing application of the target electronic device. This would allow the author of the demonstration environment to pre-load the target electronic device with browser favorites, such as Internet websites that might enhance a potential customer's experimentation with the target device. FIG. 6 provides an example of a wizard screen 130 for specifying favorites. Similar to the interface provided by wizard screen 120, wizard screen 130 may include mechanisms for specifying and describing the favorite, such as an input box 132 and an input box 134, and actuators 136 for controlling additions to and subtractions from a displayed list 138 of favorites.

Referring again to FIG. 1, additional wizard screens (not shown) or input mechanisms may be used to incorporate messages 52, history data 54 and user software 56 into a demonstration environment. Regarding messages 52, it may be useful to incorporate received voicemail and/or text messages in a demonstration environment for a mobile phone, for example. Messages 52 may also include email messages, to the extent that they are not bundled into demonstration payload 22 via PIM data or another mechanism. History data may include call and text message history for mobile phones, and/or browser history on target devices that have browsing capability. User software may include games or other additional software applications to enhance the demonstration environment.

In many cases it will be advantageous to include cleanup service 48 in the demonstration payload 22. Cleanup service 48 typically is a background executable that is installable on the target electronic device as part of the process of creating the demonstration environment. Once installed, the cleanup service operates to repeatedly and automatically reverse modifications that are made to the target electronic device during the tryout mode of the demonstration environment. As will be explained in more detail below, authoring system 20 allows the author to specify various settings which control how the cleanup service behaves once deployed in a demonstration environment on a particular target device.

Cleanup service 48 can be employed to provide various benefits. In retail settings, it is often beneficial to provide realistic use scenarios in which potential purchasers can actually access and cause modification to data and applications on the device. Over time, this activity can potentially degrade the quality of the demonstration environment. The device may become cluttered with photographs, modified PIM data, browsing history, etc. as a result of potential customers experimenting with the device. In some cases, inappropriate material may be placed on the device. In any case, it will often be desirable to periodically clean up the demonstration environment (e.g., delete added material and otherwise undo user modifications) so as to ensure the demonstration environment is preserved and retains its desired characteristics.

Figure 7:
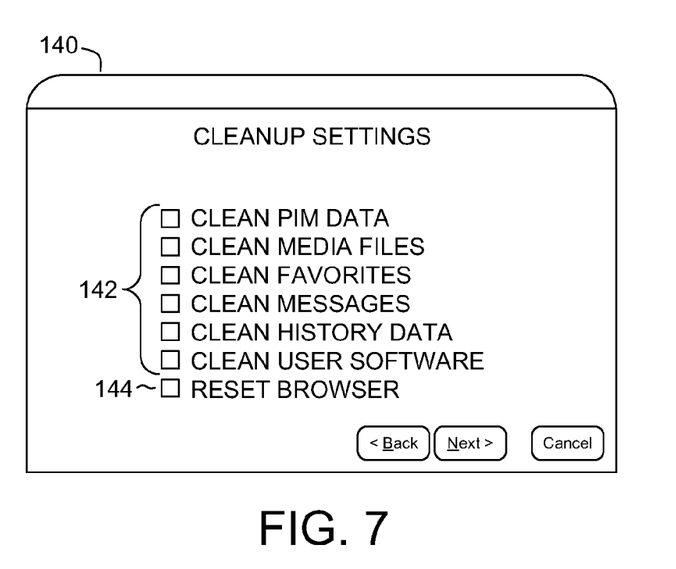

Various authoring inputs 36 may be received in order to specify operation of cleanup service. FIG. 7 shows an exemplary wizard screen 140 for specifying cleanup settings. As shown at 142, various inputs may be received to enable/disable cleaning of various categories of mock user data 44. In addition, the present example provides an option 144 for resetting a browser application on the target device. Additional settings may also be provided to provide author control over the timing of clean up operations. For example, the author can specify a frequency at which cleanup services are performed. Cleanup services can also be timed to occur in relation to mode changes between promotional mode and tryout mode. For example, the author might wish to specify that cleanup service occurs whenever the target electronic device transitions from tryout mode to promotional mode.

Cleanup service 48 can provide many advantages. The service helps to preserve the desired characteristics of the demonstration time. In a retail environment, use of the service may reduce staff time that would otherwise be needed to delete files, manually reset devices, etc.

As previously discussed, once all the authoring inputs have been received, assembler module 34 generates the demonstration payload 22. Typically, the demonstration payload also includes a client application or installer that handles the copying of files to the target electronic device. For applications, the installer will also perform the installation and configuration of any applications that play a role in the demonstration environment.

Figure 8:
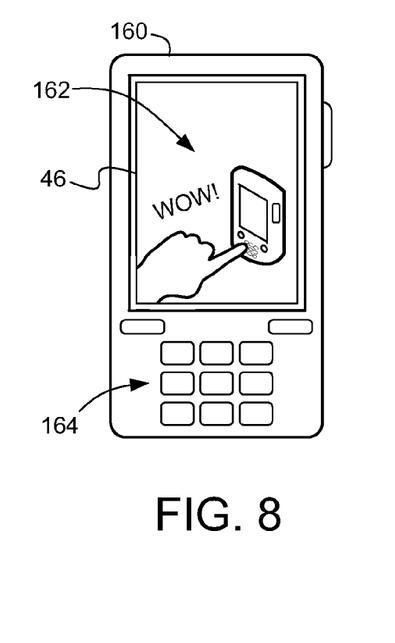
FIGS. 8 and 9 depict an exemplary electronic device that is provisioned with a demonstration environment according to the present description, and the figures also illustrate promotional and tryout modes of the demonstration environment.
Figure 9:
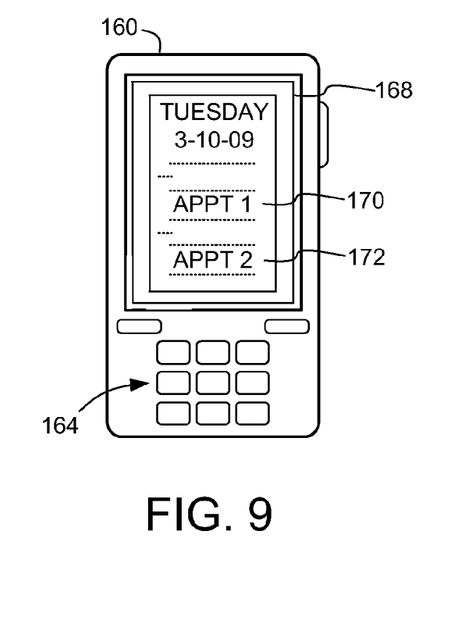

Referring now to FIGS. 8 and 9, the figures will be used to further describe and illustrate the promotional and tryout modes of a demonstration environment that has been deployed to a mobile phone 160 via the systems and methods described herein. Referring first to FIG. 8, the depicted example shows the promotional mode of the demonstration environment. In particular, a particular promotional video 162 is being played by kiosk-mode media player 46 (FIG. 1). The kiosk-mode media player does not have an end-user controllable playback interface (e.g., hard or soft buttons to play, pause and advance the media). Instead, the player may simply respond to volume adjustments, with all other buttons or controls being mapped to a command which terminates the playback of the promotion media. Regardless of the particular configuration of the kiosk-mode media player, it typically is adapted for promotional purposes, in that it provides the demonstration environment author, as opposed to the retail customer or other end user, with the primary control over how the promotional media is presented.

FIG. 9 shows mobile phone 160 after the demonstration environment has transitioned to the tryout mode, for example, following the user pressing one of the buttons on keypad 164. In the present example, a PIM application 168 is shown, in which mock PIM data (sample calendar items 170 and 172) would be accessible to a customer examining the phone. Were the customer to delete the sample calendar items, or add some test items to the calendar, the cleanup service (if installed and configured) could be used to restore the original state of the demonstration calendar. Depending on the particular authoring inputs used to construct the demonstration environment, transition could occur in various ways back to the promotional mode of FIG. 9. For example, the promotional mode could be resumed after a prescribed period of inactivity.

Figure 10:
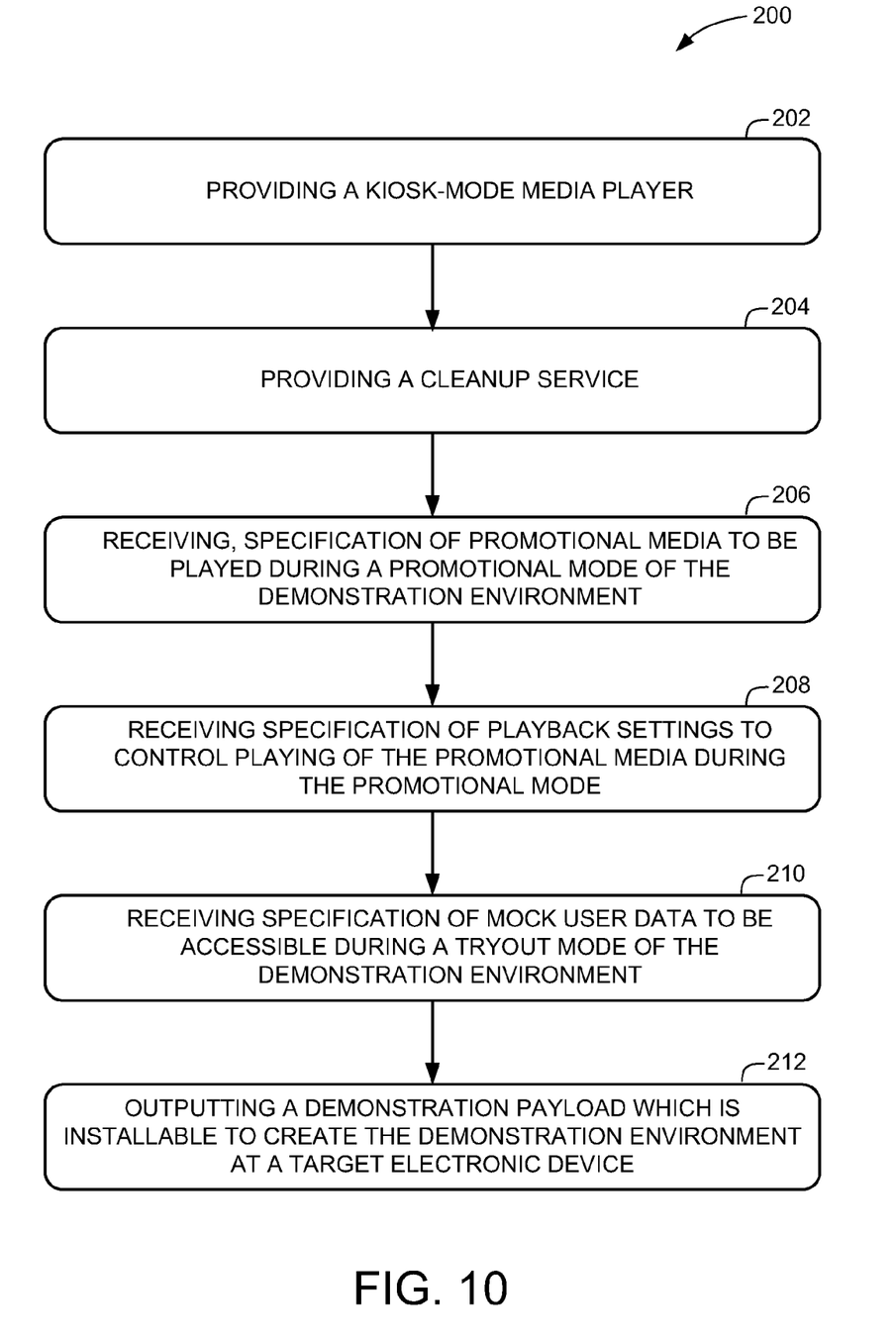
FIG. 10 depicts an exemplary method for deploying a demonstration environment to one or more electronic devices.

Referring now to the exemplary method 200 of FIG. 10, the present discussion should be understood as further encompassing a method for deploying a demonstration environment on one or more electronic devices. As shown at step 202, the method may include providing a kiosk-mode media player. As shown at step 204, the method may also including providing a cleanup service, such as the previously-described cleanup service 48 (FIG. 1).

Steps 206, 208 and 210 entail receiving various authoring inputs that are used to construct a demonstration payload that can be installed at a target device to create the demonstration environment. In particular, at 206, the method may include receiving specification of audio files, video or other promotional media to be played during a promotional mode of the demonstration environment. At 208, the exemplary method includes receiving specification of playback settings to control playing of the promotional media during the promotional mode. Among other things, these playback settings may govern operation of the kiosk-mode media player provided at step 202. Continuing with the authoring inputs, step 210 shows receiving specification of mock user data to be accessible during a tryout mode of the demonstration environment. As explained in previous examples, the mock user data may include sample PIM items, user media files, favorites, messages, history data, other user software, etc.

The authoring inputs referred to in steps 206, 208 and 210 typically are received at a computing system that is distinct from the target devices that will be outfitted with the demonstration environment. For example, an arrangement similar to the of FIG. 1 may be employed, in which the demonstration environment is authored at authoring system 20, and then ultimately distributed and deployed at one or more separate electronic devices 24.

In any event, as shown at 212, once the authoring inputs are received, the various components and settings may be assembled to create the demonstration payload. In particular, step 212 may include outputting the demonstration payload to one or more target electronic devices so as to create the demonstration environment at that target electronic device. In this example method, the output demonstration payload may include a kiosk-mode media player operative to play the promotional media on the target electronic devices during the promotional mode of the demonstration environment. The output payload may also include mock user data readable by an application on the target electronic device during the tryout mode of the demonstration environment. The output payload may further include a cleanup service operative to reverse modifications made to the demonstration environment while the target electronic device is operated in the tryout mode of the demonstration environment.

Referring again to various components of FIG. 1, it should be understood that logic subsystem 28 may be configured in various ways to perform processing and execution operations in connection with the demonstration authoring discussed herein. Logic subsystem 28 may include one or more physical devices configured to execute one or more instructions, such as instructions to display and receive authoring inputs via the various wizard screens. More generally, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions, such as to carry out the assembling functionality of assembler module 34. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Storage subsystem 30 may include one or more physical devices configured to hold data and/or instructions executable by the logic subsystem to implement the herein described methods and processes. When such methods and processes are implemented, the state of the storage subsystem may be transformed (e.g., to hold different data). The storage subsystem may include removable media and/or built-in devices. The storage subsystem may include optical memory devices, semiconductor memory devices, and/or magnetic memory devices, among others. The storage subsystem may include devices with one or more of the following characteristics: volatile, nonvolatile, dynamic, static, read/write, read-only, random access, sequential access, location addressable, file addressable, and content addressable. In some embodiments, the logic subsystem and storage subsystem may be integrated into one or more common devices, such as an application-specific integrated circuit or a system on a chip.

In typical embodiments, I/O subsystem will include a display subsystem (not shown in FIG. 1). For example, the wizard screens of FIGS. 2-7 typically are presented to the demonstration environment author via some type of display screen. In any case, the display subsystem typically provides a visual output or representation of data held by storage subsystem 30. As the herein described methods and processes change the data held by the storage subsystem, and thus transform the state of the storage subsystem, the state of the display subsystem may likewise be transformed to visually represent changes in the underlying data. The display subsystem may include one or more display devices utilizing virtually any type of technology. Such display devices may be combined with a logic subsystem and/or a storage subsystem in a shared enclosure, or such display devices may be peripheral display devices.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An authoring system comprising one or more authoring computing devices for generating an installable demonstration payload to facilitate deployment of a demonstration environment on one or more electronic devices, the authoring system comprising:
  a build interface executing on the one more authoring computing devices operative to receive authoring inputs which specify characteristics of the demonstration environment, the authoring inputs including:
  specification of promotional media to be played during a promotional mode of the demonstration environment; and
  specification of mock user data comprising a plurality of PIM items to be natively accessible by a native application that runs on a target electronic device during a tryout mode of the demonstration environment and runs on the target electronic device outside of the demonstration environment, the native application configured to access the mock user data within the demonstration environment in a same manner as accessing user data outside of the demonstration environment, the build interface providing an offset date so that a particular PIM item is dated with the offset date and all other PIM items of the plurality of PIM items are dated relative to the offset date; and
  an assembler module operative to generate the installable demonstration payload based upon the authoring inputs, the installable demonstration payload being installable on the target electronic device so as to create the demonstration environment on the target electronic device, the installable demonstration payload including a cleanup module operative to repeatedly and automatically reverse modifications made to the demonstration environment during the tryout mode.

2. The authoring system of claim 1, where the assembler module incorporates a cleanup service with the installable demonstration payload, the cleanup service being installable on the target electronic device and operative to repeatedly and automatically reverse modifications made to the target electronic device during the tryout mode of the demonstration environment.

3. The authoring system of claim 1, where the build interface includes a plurality of wizard screens via which the authoring inputs are received.

4. The authoring system of claim 1, where the authoring inputs include specification of playback settings to control playback of the promotional media during the promotional mode.

5. The authoring system of claim 4, where the assembler module incorporates a kiosk-mode media player with the installable demonstration payload, the kiosk-mode media player being loadable onto the target electronic device and operative to play the promotional media in accordance with the playback settings.

6. The authoring system of claim 5, where the playback settings include specification of how long the promotional media will be played by the kiosk-mode media player.

7. The authoring system of claim 5, where the playback settings include a volume specification for the promotional media.

8. The authoring system of claim 5, where the playback settings include specification of idle time before the kiosk-mode media player initiates playback of the promotional media.

9. The authoring system of claim 1, where the mock user data includes personal information management items readable by a personal information management program of the target electronic device.

10. The authoring system of claim 1, where the mock user data includes user media files readable by a media-presenting application of the target electronic device.

11. The authoring system of claim 1, where the mock user data includes browser favorites readable by a browsing application of the target electronic device.

12. An authoring system comprising one or more authoring computing devices for generating an installable demonstration payload to facilitate deployment of a demonstration environment on one or more electronic devices, the authoring system comprising:
  a build interface executing on the one or more authoring computing devices, the build interface including a plurality of wizard screens operative to receive authoring inputs which specify characteristics of the demonstration environment, the authoring inputs including:
  specification of promotional media to be played during a promotional mode of the demonstration environment;
  specification of mock user data comprising a plurality of PIM items to be natively accessible by a native application that runs on a target electronic device during a tryout mode of the demonstration environment and runs on the target electronic device outside of the demonstration environment, the native application configured to access the mock user data within the demonstration environment in a same manner as accessing user data outside of the demonstration environment; and
  specification of an offset date so that a particular PIM item is dated with the offset date and all other PIM items of the plurality of PIM items are dated relative to the offset date;
  a kiosk-mode media player operative to play the promotional media during the promotional mode;
  a cleanup service operative to repeatedly and automatically reverse modifications made to the demonstration environment during the tryout mode; and
  an assembler module executing on the one or more authoring computing devices, the assembler module operative to generate the installable demonstration payload based upon the authoring inputs and by bundling the promotional media, mock user data, kiosk-mode media player and cleanup service with the installable demonstration payload, the installable demonstration payload being installable on the target electronic device so as to create the demonstration environment on the target electronic device.

13. The authoring system of claim 12, where the authoring inputs include specification of playback settings to control playback of the promotional media during the promotional mode.

14. The authoring system of claim 12, where the mock user data includes personal information management items readable by a personal information management program of the target electronic device.

15. The authoring system of claim 12, where the mock user data includes user media files readable by a media-presenting application of the target electronic device.

16. The authoring system of claim 12, where the mock user data includes browser favorites readable by a browsing application of the target electronic device.

17. A method of deploying a demonstration environment on a plurality of target electronic devices, comprising:
receiving, at a computing system which is distinct from the plurality of target electronic devices, specification of promotional media to be played during a promotional mode of the demonstration environment;
receiving, at the computing system, specification of mock user data comprising a plurality of PIM items to be natively accessible by a native application that runs on a target electronic device during a tryout mode of the demonstration environment and runs on the target device outside of the demonstration environment, the native application configured to access the mock user data within the demonstration environment in a same manner as accessing user data outside of the demonstration environment, the plurality of PIM items being dated relative to an offset date; and
outputting, for installation at one of the plurality of target electronic devices, a demonstration payload which is installable to create the demonstration environment at the one of the plurality of target electronic devices, the demonstration payload including:
a kiosk-mode media player operative to play the promotional media on the one of the plurality of target electronic devices during the promotional mode of the demonstration environment;
the mock user data, which is readable by an application at the one of the plurality of target electronic devices during the tryout mode of the demonstration environment; and
a cleanup service which is operative, when installed at the one of the plurality of target electronic devices, to repeatedly and automatically reverse at a specified frequency modifications to the demonstration environment resulting from operation of the one of the plurality of target electronic devices in the tryout mode.

18. The method of claim 17, where receiving specification of the mock user data includes receiving specification of personal information management items to be accessible by a personal information management program of the one of the plurality of target electronic devices.

19. The method of claim 17, where receiving specification of the mock user data includes receiving specification of user media files readable by a media-presenting application of the one of the plurality of target electronic devices.

20. The method of claim 17, where receiving the specification of the mock user data includes receiving specification of browser favorites readable by a browsing application of the one of the plurality of target electronic devices.

* * * * *